Patented Mar. 29, 1938

2,112,305

UNITED STATES PATENT OFFICE 2,112,305

OIL COMPOSITION

Raphael Rosen, Cranford, N. J., assignor to Standard Oil Development Company, a corporation of Delaware No Drawing. Application July 14, 1934, Serial No. 735,202

12 Claims. (Cl. 87—9)

The present invention relates to improved lubricants and especially to oil compositions for the lubrication of automotive engines and other high temperature equipment. The invention will be fully understood from the following description.

Hydrocarbon oils used for the lubrication of internal combustion engines and for other similar service are subjected to severe oxidation conditions. It has been found that the more highly refined the oil the higher its rate of oxidation, and while such refining is desirable and often absolutely necessary, it is also desirable to produce a finished oil of low oxidation rate.

Certain substances have been found which, when added to lubricating oils in small proportions, have the power of greatly reducing the oxidation rate of the oil, and in the present case a new class of such substances has been discovered. The present invention relates to the general class of metallo-organic substances in which at least two metal atoms are present in the molecule and linked together according to the following formula:

$$R_xM—NR_y$$

where M and N represent the two metal atoms, the nature of which will be specified below, but which may be either the same or different elements, and where $R_x$ and $R_y$ represent organic radicals such as alkyl or aryl groups. The subscripts $x$ and $y$ denote the number of such radicals in accordance with the usual chemical nomenclature. The particular class of substances may be prepared in any preferred manner but ordinarily it is preferred to make them according to the following general equation:

$$R_xMNa + ClNR_y \rightarrow R_xM—NR_y + NaCl$$

in which the symbols have the same general significance as above, except that Na and Cl are the usual chemical symbols to denote sodium and chlorine, but it will be understood that other alkalis may be used in place of sodium and other halogens in place of chlorine. It will be understood that more than two metal atoms may be present in the molecule if desired according to the following formula:

where M, N and P are the metal atoms and R has the significance denoted above. These reactions are preferably carried out in a solvent comprising liquid ammonia or low boiling amines and at temperatures below 0° C., preferably below —20 or —30° C.

The metals which may be used in producing the improved agent generally comprise those of the 2nd, 3rd, 4th and 5th group of the periodic table of elements, and particularly those of the 2nd or right-hand sub-group. In general it is found that in any particular group the heavier molecular weight metals are more effective than the lighter. Thus, in general mercury is more effective than cadmium or zinc, lead more desirable than tin or germanium and bismuth is better than arsenic or antimony. As stated above, there are at least two of the metal atoms in the molecule of the particular agent and these may be identical or may be different. For example, in cases where two metal atoms are present, the agent may contain only lead or tin or it may contain an atom each of lead and tin, or in cases where three metal atoms are present, tin, lead and antimony may be used.

As to the organic portion of the molecule, it should be understood that the number of such groups must depend upon the valance of the particular metal to which they are attached. Hydrogen may be present in lieu of some of the carbon containing groups, but it is preferred that at least one carbon containing group be present and ordinarily all of the hydrogen is replaced by carbon containing groups which may be similar or which may be of the different types to be enumerated below.

The carbon containing groups may be aliphatic, such as methyl, ethyl, propyl, butyl, amyl or the like, either of straight chain or branched chain structure as in isopropyl or secondary butyl groups. These groups may be purely hydrocarbon as is preferred or they may be substituted with halogens or sulphur and other elements.

It is generally preferred to provide at least one aryl group in the molecule and among these may be mentioned phenyl, naphthyl and the like, but the alkylated aryl groups such as cresyl, isopropyl alpha naphthyl and the like may also be used. In addition to these, hydrogenated aryl groups may, of course, be used. The above cyclic group may be either purely hydrocarbon or they may contain other elements such as hydroxyl or amino substituted groups or halogens either attached directly to the ring or in a side chain as will be appreciated.

The efficiency of the particular compounds depends on the particular metal or metals used and the particular organic groups. When all of the organic groups are alkyl, that is to say, aliphatic, the compounds are not very effective until temperatures of 200 to 250° C. are reached, but when aryl groups are present the compounds generally have a wider range of effectiveness, for example, as low as 150 to 200° C., and up to 250° C. and higher.

The compounds used for the present compositions are those which are soluble in hydrocarbon oils, at least to the extent necessary for present purposes. If a particular combination of metals is found not to give sufficiently soluble products for the best results, it has been found that the addition of more alkyl groups or alkyl groups containing a greater number of carbon atoms will increase the solubility to the point desired. It is often desirable to add small amounts of benzol or toluol or their equivalents to dissolve the agents and to cause an intimate dispersion through the oil. If desired the lower molecular weight solvents may be removed by distillation or otherwise.

The amount of the agents used may be quite minute so that it is not necessary to obtain a high degree of solubility, for example, as little as .01 to .02% often produces good effects but it is often desirable to use as high as .1 to .3%, and it is quite rare that more than .5% is required.

These materials may be used in a great variety of petroleum products, for example, in lubricating oils and greases obtained from all variety of crudes such as obtained from paraffin or naphthene base crudes which have been refined by the ordinary methods of distillation, acid, alkali and clay treatment or especially refined by other processes, among which may be mentioned hydrogenation, destructive hydrogenation, solvent extraction and the like, as well as the heavy acid treatment for production of white oils which are used for medicinal and technical purposes. These compounds are of particular value in turbine oils, motor oils, flushing oils and compounds for similar service. The oils may contain more than one of the particular agents mentioned herein and may also contain other substances which it is now customary to add to lubricating oils, such as pour point depressors or inhibitors, oiliness agents, dyes for cast and color, extreme pressure agents, thickeners, sludge dispersers and the like.

*Example 1*

Trimethyl triphenyl stannane is prepared according to the following equation:

$(CH_3)_3SnNa + (C_6H_5)_3SnCl \longrightarrow (CH_3)_3Sn-Sn(C_6H_5)_3 + NaCl$

Reaction is brought about by mixing the reactants in equivalent proportions in liquid ammonia and reaction takes place fairly rapidly. To test the efficacy of this substance .2% is added to a well refined lubricating oil of S. A. E. 20 grade. This blend is then compared with a blank, the same oil which contained none of the substance.

|  | Cone test | Oxygen absorption test, CCO₂ 10 cc. sample/15 minutes |
|---|---|---|
| Oil (blank) sample | .50 | >100 |
| Oil+2% (CH₃)₃Sn₂(C₆H₅)₃ | .32 | 7—10—11—10 |

The cone deposit test is conducted by passing the oil at a definite rate through a groove cut in the inner surface of a steel cone of standardized dimensions, held at a temperature of 250° C. The deposit represents the sum of the solids deposited on the cone and found suspended in the oil after passing therethrough. The numeral represents milligrams of insolubles per 60 cc. of oil.

The oxygen absorption test represents the amount of oxygen in cubic centimeters absorbed during successive 15 minute intervals where oxygen is conducted in a closed circuit, bubbling through 10 cc. of oil, which is maintained at a temperature of 200° C. From these tests it will be observed that the presence of the particular tin compound reduced the amount of the cone deposit very materially and greatly reduced the rate at which oxygen was absorbed.

A wide variety of other compounds are equally satisfactory, among which may be mentioned hexaphenyl tin, tetracresyl bismuth, tetramethyl mercury, hexaphenyl lead, trimethyl tin triphenyl lead, triethyl tin diphenyl bismuth, tripropyl tin dicresyl antimony, dinaphthyl bismuth dicresyl arsenic, diisopropyl tin diphenyl bismuth dicresyl arsenic and trimethyl tin diphenyl thallium.

The present invention is not limited to any theory of the action of metallo organic agents nor to any particular agent or metallo element, but only to the following claims in which it is desired to claim all novelty inherent in the invention.

I claim:

1. An improved lubricant comprising a hydrocarbon lubricating oil and an oil soluble metallo organic compound containing at least two but not more than three metal atoms selected from the 2nd, 3rd, 4th and 5th groups of the periodic system, two of said metal atoms being linked together in the molecule and directly attached to at least one carbon atom.

2. An improved lubricant comprising a hydrocarbon lubricating oil and an oil soluble metallo organic compound containing at least two but not more than three metal atoms selected from the 2nd, 3rd, 4th and 5th groups of the periodic system, two of said metal atoms being linked together, at least one of which is an atom of tin, said atoms being directly attached to at least one carbon atom.

3. Composition according to claim 2 in which the metallo-organic compound contains two metal atoms at least one of which is an atom of tin.

4. A composition according to claim 2 in which the metallo-organic compound contains two atoms of tin.

5. An improved lubricant comprising a hydrocarbon lubricating oil and an oil soluble metallo organic compound containing at least two but not more than three metal atoms selected from the 2nd, 3rd, 4th and 5th groups of the periodic system, two of said metal atoms being linked together, at least one of which is an atom of bismuth, said atoms being directly attached to at least one carbon atom.

6. Composition according to claim 5 containing two metal atoms at least one of which is an atom of bismuth.

7. Composition according to claim 5 in which the metallo-organic compound contains two atoms of bismuth.

8. Composition according to claim 5 in which the metallo-organic compound is tetrecresyl bismuth.

9. An improved lubricant comprising a hydrocarbon lubricating oil and an oil soluble metallo organic compound containing at least two but not more than three metal atoms selected from the 2nd, 3rd, 4th and 5th groups of the periodic system, two of said metal atoms being linked together, at least one of which is an atom of mercury, said atoms being directly attached to at least one carbon atom.

10. Composition according to claim 9 containing two metal atoms at least one of which is an atom of mercury.

11. Composition according to claim 9 in which the metallo-organic compound is tetremethyl mercury.

12. A lubricating oil containing a small amount of trimethyl triphenyl stannane.

RAPHAEL ROSEN.